(12) United States Patent
Cheng et al.

(10) Patent No.: US 8,370,865 B2
(45) Date of Patent: Feb. 5, 2013

(54) SENSING DEVICE WITH ARM ACTUATING IN SEESAW APPROACH

(75) Inventors: Shih-Tung Cheng, Hsinchu (TW); Po-Chien Chou, Hsinchu (TW); Yu-Cheng Lin, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 271 days.

(21) Appl. No.: 12/789,437

(22) Filed: May 27, 2010

(65) Prior Publication Data

US 2011/0273975 A1    Nov. 10, 2011

(30) Foreign Application Priority Data

May 6, 2010   (TW) ................................ 99114546 A

(51) Int. Cl.
G11B 17/028 (2006.01)
G11B 15/52 (2006.01)
(52) U.S. Cl. ........................................ 720/662; 369/300
(58) Field of Classification Search .................. 369/300; 720/662, 689, 690
See application file for complete search history.

(56) References Cited

U.S. PATENT DOCUMENTS

| | | | | |
|---|---|---|---|---|
| 3,674,277 | A * | 7/1972 | Kelly et al. | 369/231 |
| 3,731,938 | A * | 5/1973 | Wren | 369/252 |
| 3,815,924 | A * | 6/1974 | Hasselbach | 369/253 |
| 4,039,195 | A | 8/1977 | Iyeta | |
| 4,114,895 | A * | 9/1978 | Eckhart | 369/251 |
| 4,139,200 | A * | 2/1979 | Iyeta | 369/220 |
| 4,184,688 | A * | 1/1980 | Omura et al. | 369/216 |
| 4,277,070 | A * | 7/1981 | Dinsdale et al. | 369/248 |
| 4,322,840 | A | 3/1982 | Kusaka | |
| 4,479,210 | A * | 10/1984 | Nakayama | 369/194 |
| 4,570,253 | A * | 2/1986 | Firebaugh | 369/255 |
| 4,769,800 | A * | 9/1988 | Moser et al. | 369/44.14 |
| 5,282,190 | A * | 1/1994 | Maruo et al. | 369/300 |
| 5,442,606 | A | 8/1995 | McCaslin et al. | |
| 5,598,397 | A | 1/1997 | Sim | |
| 5,663,937 | A | 9/1997 | Takahashi | |
| 5,748,605 | A * | 5/1998 | Lee | 369/222 |
| 5,812,518 | A * | 9/1998 | Fukakusa | 720/682 |
| 5,886,959 | A | 3/1999 | Bischoff et al. | |
| 6,052,357 | A | 4/2000 | Ogawa et al. | |
| 6,657,942 | B2 | 12/2003 | Lee et al. | |
| 6,665,259 | B1 * | 12/2003 | Nakao | 720/681 |

(Continued)

OTHER PUBLICATIONS

Blankenbeckler et al., Recent Advancements in DataPlay's Small Form-Factor Optical Disc and Drive, Japanese Journal of Applied Physics vol. 45, No. 2B, 2006, pp. 1181-1186. Blankenbeckler et al., Performance Characteristics of a 32mm Small Form-Factor Optical Disc and Drive, Japanese Journal of Applied Physics vol. 43, No. 7B, pp. 4896-4899.
Bernard W. Bell Jr., DataPlay's Mobile Recording Technology, SPIE vol. 4342 (2002), pp. 543-552.

(Continued)

*Primary Examiner* — Brian Miller
(74) *Attorney, Agent, or Firm* — Jianq Chyun IP Office

(57) ABSTRACT

A sensing device including a base, a pillar, an arm, a sensing element and a driving module is provided. The base has a supporting surface suitable for supporting the object. The pillar is disposed on the supporting surface. The arm has two ends and a pivot portion between the two ends. The pivot position is pivoted to the pillar along an axis substantially parallel to the supporting surface. The sensing element is disposed on the arm and located between an end and the pivot portion. The sensing element is located between the base and the object. The driving module is disposed between the arm and the base. The driving module drives the arm to pivot relatively to the pillar along the axis, and the sensing element moves toward or away from the object as the arm is pivoted.

6 Claims, 3 Drawing Sheets

U.S. PATENT DOCUMENTS

| | | | |
|---|---|---|---|
| 6,970,410 B2 | 11/2005 | Kadlec et al. | |
| 7,038,977 B2 | 5/2006 | Cheong et al. | |
| 7,086,071 B2 * | 8/2006 | Schroder | 720/683 |
| 7,382,713 B2 * | 6/2008 | Graham | 369/252 |
| 7,540,004 B2 * | 5/2009 | Lee et al. | 720/662 |
| 7,616,532 B2 * | 11/2009 | Nakamura et al. | 369/44.19 |
| 2002/0097663 A1 * | 7/2002 | O'Neill | 369/222 |
| 2004/0145996 A1 * | 7/2004 | Shinoda | 369/112.23 |

OTHER PUBLICATIONS

David Davies, A Biometric Access Personal Optical Storage Device, SPIE Newsroom, 2007, pp. 1-2.

Blankenbeckler et al., An Increased Capacity DataPlay Optical Disc and Drive, SPIE vol. 5380 (SPIE, Bellingham, WA, 2004), pp. 171-181.

* cited by examiner

SENSING DEVICE WITH ARM ACTUATING IN SEESAW APPROACH

CROSS-REFERENCE TO RELATED APPLICATION

This application claims the priority benefit of Taiwan application serial no. 99114546, filed on May 6, 2010. The entirety of the above-mentioned patent application is hereby incorporated by reference herein and made a part of this specification.

BACKGROUND

1. Field of the Invention

The present invention relates to a sensing device. More particularly, the present invention relates to an optical sensing device.

2. Description of Related Art

With development of computer technology, an amount of data processed by computer is greatly increased. As the computers are further developed, data types that can be processed by the computer are increased, and a required storage capacity is also increased. Since an optical disc has advantages of low cost, portability, large storage capacity, easy preservation, long duration of preservation, and non-easiness of damage of data, it has replaced the conventional magnetic recording medium as one of the most indispensable optical storage medium in modern life. As the optical discs are widely used, optical disc drives used for reading data of the optical discs have become indispensable electronic products in daily life.

Generally, an optical pick-up head is configured in an optical disc drive for reading data stored on the optical disc. FIG. 1 is a schematic diagram illustrating an optical pick-up head of a conventional optical disc drive. Referring to FIG. 1, the optical pick-up head 50 is disposed on an arm 60, and the arm 60 is connected to an arm 80 through an elastic element 70. When an actuating device within the optical disc drive exerts a force to the arm 60 along a direction D, the optical pick-up head 50 can be pushed towards an optical disc 90 through deformation of the elastic element 70, so as to perform data pick-up. Since the elastic element 70 has to bear weights of the arm 60 and the optical pick-up head 50, and deforms in response to the external force, the elastic element 70 is easy to have a structural damage or even break due to stress concentration.

SUMMARY

The invention is directed to a sensing device, which can reduce a chance that a structure of the sensing device is damaged due to stress concentration.

The invention provides a sensing device, which is adapted to sense an object. The sensing device includes a base, a pillar, an arm, a sensing element and a driving module. The base has a supporting surface suitable for supporting the object. The pillar is disposed on the supporting surface. The arm has a first end, a second end and a pivot portion between the first end and the second end. The pivot position is pivoted to the pillar along a first axis substantially parallel to the supporting surface, so as to pivot along the first axis and actuate in a seesaw approach. The sensing element is disposed on the arm and located between the first end and the pivot portion, wherein the sensing element is located between the base and the object. The driving module is disposed between the arm and the base, wherein the driving module drives the arm to pivot relatively to the pillar along the first axis, and the sensing element moves towards or away from the object as the arm is pivoted.

In an exemplary embodiment of the invention, the driving module includes an electromagnetic coil and a magnetic element. The electromagnetic coil is disposed on the arm and located between the arm and the base. The magnetic element is disposed on the supporting surface and located between the arm and the base, and is aligned to the electromagnetic coil, wherein a magnetic force generated between the electromagnetic coil and the magnetic element drives the arm to pivot relatively to the pillar along the first axis.

In an exemplary embodiment of the invention, the electromagnetic coil is disposed between the second end and the pivot portion.

In an exemplary embodiment of the invention, the pillar is pivoted to the base along a second axis substantially perpendicular to the supporting surface. The sensing device further includes an electromagnetic coil and a magnetic element. The electromagnetic coil is disposed at the second end of the arm. The magnetic element is disposed on the supporting surface and is aligned to the electromagnetic coil, wherein a magnetic force generated between the electromagnetic coil and the magnetic element drives the pillar to drive the arm to pivot relatively to the base along the second axis, and the sensing element is shifted on a surface of the object as the arm is pivoted.

In an exemplary embodiment of the invention, the electromagnetic coil is moved along a moving path as the arm is pivoted relatively to the base along the second axis. The sensing device further includes a magnetizer disposed on the supporting surface and extending along the moving path to penetrate through the electromagnetic coil.

In an exemplary embodiment of the invention, the pillar includes a shaft and a pivot assembly. The shaft is pivoted to the base along the second axis. The pivot assembly is fixed to the shaft, wherein the arm is pivoted to the pivot assembly along the first axis.

In an exemplary embodiment of the invention, the pivot portion of the arm has two dents, and the pivot assembly includes a frame, two latches and two steel balls. The frame is fixed to the shaft and has two assembling portions. Each of the assembling portions has a through hole extending along the first axis. The pivot portion of the arm is disposed between the two assembling portions, and the two dents are respectively aligned to the two through holes. The two latches are respectively inserted into the two through holes. The two steel balls are respectively pressed to the two dents by the two latches.

In an exemplary embodiment of the invention, a material of the arm is a composite material or alloy.

In an exemplary embodiment of the invention, the sensing device further includes a piezoelectric sheet disposed at a front end of the arm, wherein the sensing element is disposed on the piezoelectric sheet, and when the sensing element moves towards the object as the arm is pivoted, and an optical axis offset is generated, the piezoelectric sheet is powered and deformed to amend an optical axis inclining angle of the sensing element.

In an exemplary embodiment of the invention, the sensing device is an optical disc drive, the object is an optical disc, and the sensing element is an optical pick-up head.

According to the above descriptions, in the invention, the sensing element is disposed on the arm, and the arm is pivoted to the pillar. When the driving device drives the arm to rotate relatively to the pillar, the sensing element is driven to move towards the object, so as to sense the object. Since the arm drives the sensing element by rotating relatively to the pillar rather than driving the sensing element through structural deformation, a chance that the arm is damaged due to stress concentration is reduced, so that a service life thereof is prolonged.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
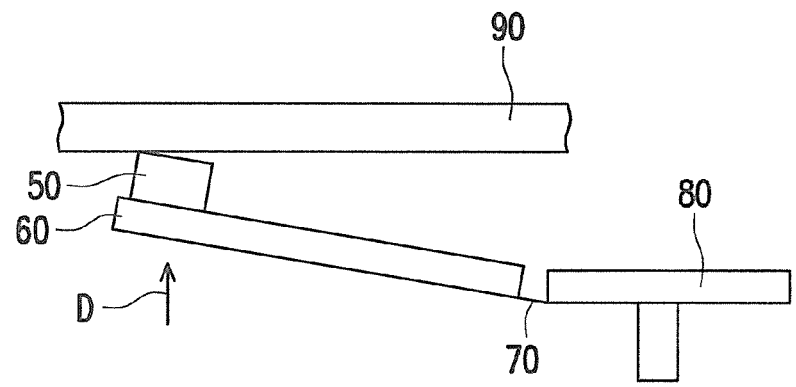
FIG. 1 is a schematic diagram illustrating an optical pick-up head of a conventional optical disc drive.
Figure 2:
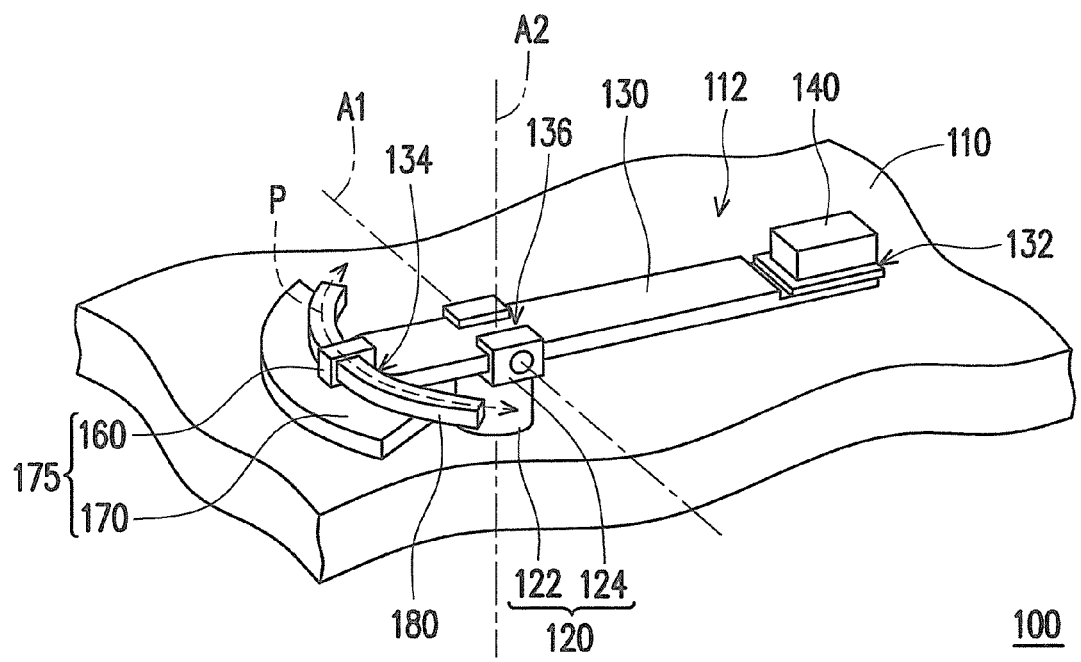
FIG. 2 is a three-dimensional view of a sensing device according to an exemplary embodiment of the invention.

FIG. 2 is a three-dimensional view of a sensing device according to an exemplary embodiment of the invention. Referring to FIG. 2, the sensing device 100 includes a base 110, a pillar 120, an arm 130, and a sensing element 140. The base 110 has a supporting surface 112. The pillar 120 is disposed on the supporting surface 112. The arm 130 has a first end 132, a second end 134 and a pivot portion 136 between the first end 132 and the second end 134, wherein the pivot position 136 is pivoted to the pillar 120 along a first axis A1 substantially parallel to the supporting surface 112. The sensing element 140 is disposed on the arm 130 and located between the first end 132 and the pivot portion 136.

Figure 3A:
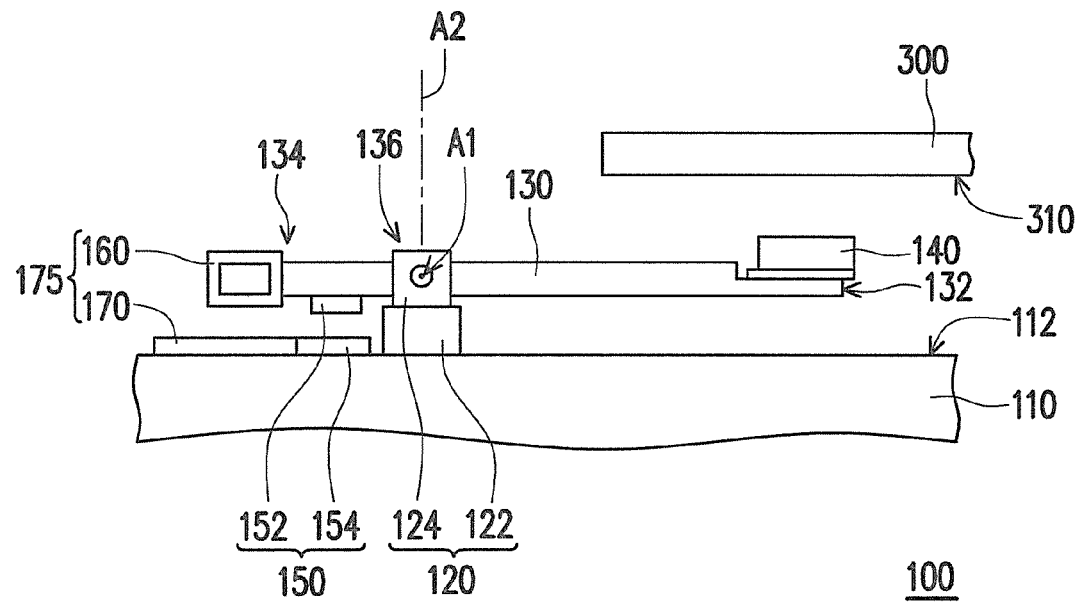
FIG. 3A and FIG. 3B are schematic diagrams illustrating an operation of a sensing device of FIG. 2.
Figure 3B:
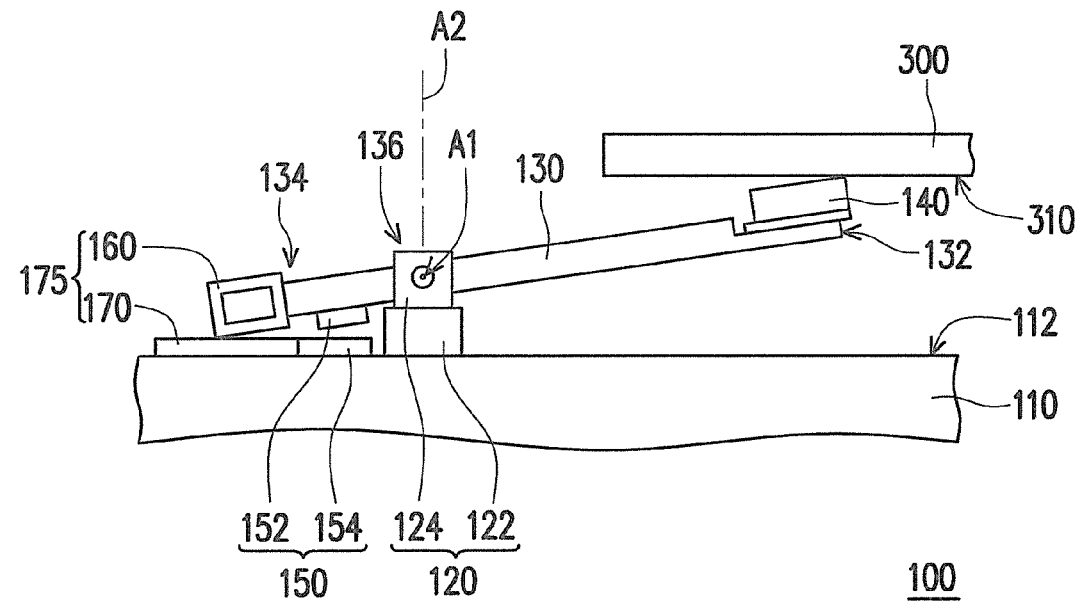

FIG. 3A and FIG. 3B are schematic diagrams illustrating an operation of the sensing device of FIG. 2. Referring to FIG. 3A and FIG. 3B, the sensing device 100 is, for example, an optical disc drive, and the sensing element 140 is, for example, an optical pick-up head of the optical disc drive, which is suitable for reading an optical disc 300. In detail, the optical disc 300 is suitable for being supported by the base 110, and is located on the supporting surface 112, and the sensing element 140 is located between the optical disc 300 and the base 110. The sensing device 100 further includes a driving module 150, and the driving module 150 is disposed between the arm 130 and the base 110, wherein the driving module 150 is suitable for driving the arm 130 to pivot relatively to the pillar 120 along the first axis A1, so as to drive the sensing element 140 to move towards (as that shown in FIG. 3B) or away from (as that shown in FIG. 3A) the optical disc 300 as the arm 130 is pivoted. When the sensing element 140 approaches the optical disc 300 as that shown in FIG. 3B, the sensing element 140 can read data from the optical disc 300.

It should be noticed that since the arm 130 drives the sensing element 140 by rotating relatively to the pillar 120 rather than driving the sensing element 140 through structural deformation, a chance that the arm 130 is damaged due to stress concentration is reduced, so that a service life thereof is prolonged. The sensing element 140 of the present exemplary embodiment can be a blu-ray optical pick-up head, a near-field optical pick-up head, a red-ray optical pick-up head or a miniaturized optical pick-up head, which is not limited by the invention.

Referring to FIG. 3A and FIG. 3B, in detail, the driving module 150 includes an electromagnetic coil 152 and a magnetic element 154. The electromagnetic coil 152 is disposed on the arm 130 and located between the arm 130 and the base 110. The magnetic element 154 is disposed on the supporting surface 112 and located between the arm 130 and the base 110, and is aligned to the electromagnetic coil 152. In this way, a magnetic force generated between the electromagnetic coil 152 and the magnetic element 154 can drive the arm 130 to pivot relatively to the pillar 120 along the first axis A1. In the present exemplary embodiment, the magnetic element 154 is, for example, a permanent magnet.

Moreover, referring to FIG. 2, FIG. 3A and FIG. 3B, in the present exemplary embodiment, the pillar 120 is pivoted to the base 110 along a second axis A2 substantially perpendicular to the supporting surface 112. The sensing device 100 further includes an electromagnetic coil 160 and a magnetic element 170, and the electromagnetic coil 160 and the magnetic element 170 form a driving module 175. The electromagnetic coil 160 is disposed at the second end 134 of the arm 130. The magnetic element 170 is disposed on the supporting surface 112 and is aligned to the electromagnetic coil 160, wherein a magnetic force generated between the electromagnetic coil 160 and the magnetic element 170 drives the pillar 120 to drive the arm 130 to pivot relatively to the base 110 along the second axis A2, and the sensing element 140 is shifted on a surface 310 of the optical disc 300 as the arm 130 is pivoted, so as to sense data stored in different segments of the optical disc 300. In the present exemplary embodiment, the magnetic element 170 is, for example, a permanent magnet.

It should be noticed that in the present exemplary embodiment, the electromagnetic coil 152 is disposed between the second end 134 and the pivot portion 136, which is located adjacent to the electromagnetic coil 160 and the magnetic element 170. In other words, the electromagnetic coil 152, the magnetic element 154, the electromagnetic coil 160 and the magnetic element 170 can be integrated at a same place on the base 110, wherein the magnetic element 154 and the magnetic element 170 are disposed adjacent to each other, and an S pole of the magnetic element 154 and an N pole of the magnetic element 170 (or an N pole of the magnetic element 154 and an S pole of the magnetic element 170) respectively face upwards, so that lines of magnetic force generated by the magnetic element 154 and the magnetic element 170 can be more concentrated, so that a driving force for the arm 130 is improved.

Referring to FIG. 2, to concentrate the lines of magnetic force at a place where the electromagnetic coil 160 is located, a magnetizer 180 can be disposed on the base 110 to penetrate through the electromagnetic coil 160. In detail, in the present exemplary embodiment, the electromagnetic coil 160 can move along a moving path P as the arm 130 is pivoted relatively to the base 110 along the second axis A2, and the magnetizer 180 extends along the moving path P and penetrates through the electromagnetic coil 160, so that the lines of magnetic force are concentrated on the magnetizer 180. A material of the magnetizer 180 can be nickel-plated steel or pure iron, etc., through the invention is not limited thereto, and other suitable magnetizers can also be used.

Figure 4:
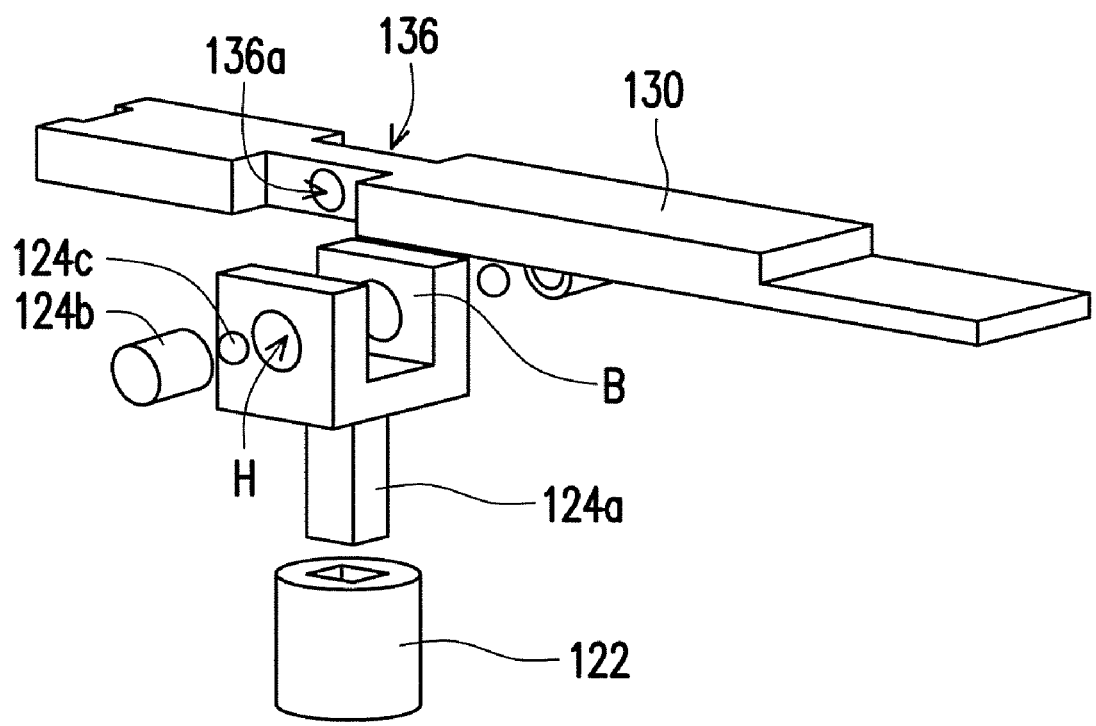
FIG. 4 is an exploded view of a part of components of a sensing device of FIG. 2.

FIG. 4 is an exploded view of a part of components of the sensing device of FIG. 2. Referring to FIG. 2 and FIG. 4, the pillar 120 includes a shaft 122 and a pivot assembly 124. The shaft 122 is pivoted to the base 110 along the second axis A2. The pivot assembly 124 is fixed to the shaft 122, wherein the arm 130 is pivoted to the pivot assembly 124 along the first axis A1. Referring to FIG. 4, further, the pivot portion 136 of the arm 130 has two dents 136a, and the pivot assembly 124 includes a frame 124a, two latches 124b and two steel balls 124c.

The frame 124a is fixed to the shaft 122 and has two assembling portions B. Each of the assembling portions B has a through hole H extending along the first axis A1 (shown in FIG. 2). The pivot portion 136 of the arm 130 is disposed between the two assembling portions B (shown in FIG. 2), and the two dents 136a are respectively aligned to the two through holes H. The two latches 124b are respectively inserted into the two through holes H. The two steel balls 124c are respectively pressed to the two dents 136a by the two latches 124b, so that the arm 130 is pivoted between the two assembling portions B. In the invention, a method of pivoting the arm 130 to the pillar 120 is not limited, and other suitable pivot structures can also be applied. Moreover, the arm 130 of the present exemplary embodiment is, for example, a structure formed integrally, so that a fabrication process thereof can be simplified, though the invention is not limited thereto, and in other exemplary embodiments, the arm 130 can also be formed by stacking multiple substrates, so as to further reduce a stress concentration degree thereof.

Figure 5:
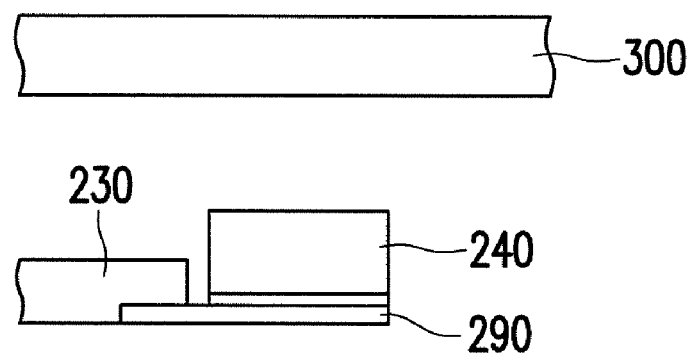
FIG. 5 is a partial side view of a sensing device installed with a piezoelectric material according to another exemplary embodiment of the invention.

FIG. 5 is a partial side view of a sensing device according to another exemplary embodiment of the invention. Referring to FIG. 5, in the present exemplary embodiment, a piezoelectric sheet 290 is disposed at a front end of an arm 230, wherein the piezoelectric sheet 290 is connected to a sensing element 240. In this way, when the sensing element 240 moves towards the optical disc 300 as the arm 230 is pivoted, the piezoelectric sheet 290 can be powered and deformed to change an inclining angle of the sensing element 230 to amend an optical axis offset, so that the sensing element 240 can be more closed to the optical disc 300, and accordingly a sensing efficiency thereof is improved.

In summary, in the invention, the sensing element is disposed on the arm, and the arm is pivoted to the pillar. When the driving device drives the arm to rotate relatively to the pillar, the sensing element is driven to move towards the object, so as to sense the object. Since the arm drives the sensing element by rotating relatively to the pillar rather than driving the sensing element through structural deformation, a chance that the arm is damaged due to stress concentration is reduced, so that a service life thereof is prolonged. Moreover, the arm can be design as a structure formed integrally, so as to simplify a fabrication process and reduce a fabrication cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sensing device, adapted to sense an object, the sensing device comprising:
   a base, having a supporting surface for supporting the object;
   a pillar, disposed on the supporting surface;
   an arm, having a first end, a second end and a pivot portion between the first end and the second end, wherein the pivot position is pivoted to the pillar along a first axis substantially parallel to the supporting surface, so as to pivot along the first axis and actuate in a seesaw approach;
   a sensing element, disposed on the arm and located between the first end and the pivot portion, wherein the sensing element is located between the base and the object;
   a driving module, disposed between the arm and the base and comprising a first electromagnetic coil and a first magnetic element,, wherein the first electromagnetic coil is disposed on the arm and located between the arm and the base, the first magnetic element is disposed on the supporting surface and located between the arm and the base, and aligned to the first electromagnetic coil, a magnetic force generated between the first electromagnetic coil and the first magnetic element drives the arm to pivot the arm to pivot relatively to the pillar along the first axis, and the sensing element moves towards or away from the object as the arm is pivoted;
   a second electromagnetic coil, disposed at the second end of the arm; and
   a second magnetic element, disposed on the supporting surface and aligned to the second electromagnetic coil, wherein the pillar is pivoted to the base along a second axis substantially perpendicular to the supporting surface, a magnetic force generated between the second electromagnetic coil and the second magnetic element drives the pillar to drive the arm to pivot relatively to the base along the second axis, and the sensing element is shifted on a surface of the object as the arm is pivoted, wherein the first magnetic element and the second magnetic element are disposed adjacent to each other,
   wherein the pillar comprises a shaft and a pivot assembly, the shaft is pivoted to the base along the second axis, the pivot assembly is fixed to the shaft, the arm is pivoted to the pivot assembly along the fist axis, the pivot portion of the arm has two dents, the pivot assembly comprises a frame, two latches and two steel balls, the frame is fixed to the shaft and has two assembling portions, each of the assembling portions has a through hole extending along the first axis, the pivot portion of the arm is disposed between the two assembling portions, the two dents are respectively aligned to the two through holes, the two latches are respectively inserted into the two through holes, and the two steel balls are respectively pressed to the two dents by the two latches.

2. The sensing device as claimed in claim 1, wherein the electromagnetic coil is disposed between the second end and the pivot portion.

3. The sensing device as claimed in claim 1, wherein the electromagnetic coil is moved along a moving path as the arm is pivoted relatively to the base along the second axis, and the sensing device further comprises:
   a magnetizer, disposed on the supporting surface and extending along the moving path to penetrate through the electromagnetic coil.

4. The sensing device as claimed in claim 1, wherein a material of the arm is a composite material or alloy.

5. The sensing device as claimed in claim 1, further comprising:
   a piezoelectric sheet, disposed at a front end of the arm, wherein the sensing element is disposed on the piezoelectric sheet, and when the sensing element moves towards the object as the arm is pivoted, and an optical axis offset is generated, the piezoelectric sheet is powered and deformed to amend an optical axis inclining angle of the sensing element.

6. The sensing device as claimed in claim 1, wherein the sensing device is an optical disc drive, the object is an optical disc, and the sensing element is an optical pick-up head.

* * * * *